(12) United States Patent
Cho et al.

(10) Patent No.: US 11,858,426 B2
(45) Date of Patent: Jan. 2, 2024

(54) LUGGAGE BOARD APPARATUS FOR VEHICLE

(71) Applicants: Hyundai Motor Company, Seoul (KR); Kia Corporation, Seoul (KR); SEGOS, Incheon (KR); KBI DONGKOOK IND. CO., LTD., Seoul (KR)

(72) Inventors: Min Ho Cho, Gyeonggi-do (KR); Sung Joon Kang, Incheon (KR); In Chan Jeong, Ulsan (KR)

(73) Assignees: Hyundai Motor Company, Seoul (KR); Kia Corporation, Seoul (KR); SEGOS, Icheon (KR); KBI Dongkook Ind. Co., Ltd., Seoul (KR)

( * ) Notice: Subject to any disclaimer, the term of this patent is extended or adjusted under 35 U.S.C. 154(b) by 0 days.

(21) Appl. No.: 17/731,950

(22) Filed: Apr. 28, 2022

(65) Prior Publication Data
US 2023/0063725 A1    Mar. 2, 2023

(30) Foreign Application Priority Data
Aug. 26, 2021    (KR) .................. 10-2021-0113463

(51) Int. Cl.
*B60R 11/00* (2006.01)

(52) U.S. Cl.
CPC ....... *B60R 11/00* (2013.01); *B60R 2011/0036* (2013.01); *B60R 2011/0082* (2013.01); *B60R 2011/0092* (2013.01)

(58) Field of Classification Search
CPC ............. B60R 11/00; B60R 2011/0036; B60R 2011/0082; B60R 2011/0092; B60R 5/04; B60R 5/048; B60R 2011/0084; B60N 3/008; B60P 3/39; F16F 9/02; F16H 25/2018; B66F 7/065
USPC ...................................... 296/36.16
See application file for complete search history.

(56) References Cited

U.S. PATENT DOCUMENTS

| | | | | |
|---|---|---|---|---|
| 6,045,150 A | * | 4/2000 | Al-Toukhi | B62B 3/027 248/676 |
| 6,070,899 A | * | 6/2000 | Gines | B62B 5/0003 280/655 |
| 7,179,040 B2 | * | 2/2007 | Masuda | B66F 7/08 414/641 |
| 2002/0149176 A1 | * | 10/2002 | Miller | B62B 3/027 280/639 |
| 2014/0265411 A1 | * | 9/2014 | Thota | B60N 2/36 296/37.16 |
| 2022/0242283 A1 | * | 8/2022 | Sterling | B60N 2/686 |

FOREIGN PATENT DOCUMENTS

| | | | | |
|---|---|---|---|---|
| DE | 102018005633 B3 | * | 1/2019 | |
| KR | 20020052909 A | | 7/2002 | |
| RU | 203010 U1 | * | 3/2021 | ............... B60R 5/04 |

* cited by examiner

*Primary Examiner* — Pinel E Romain
(74) *Attorney, Agent, or Firm* — Fox Rothschild LLP

(57) ABSTRACT

A luggage board apparatus for a vehicle includes an upper board and a lower board. The upper board and the lower board are capable of moving together in a vertical direction, and the upper board is capable of moving in a front-rear direction with respect to the lower board. A shopping cart may be seated, loaded and stored on the luggage board by using a slide rail provided on the luggage board and a slide roller coupled to the slide rail on the luggage board.

20 Claims, 20 Drawing Sheets

LUGGAGE BOARD APPARATUS FOR VEHICLE

CROSS REFERENCE TO RELATED APPLICATION

The present application claims priority of Korean Patent Application No. 10-2021-0113463 filed on Aug. 26, 2021, the entire content of which is incorporated herein for all purposes by this reference.

TECHNICAL FIELD

The present invention relates to a luggage board apparatus for a vehicle. The luggage board apparatus for a vehicle includes an upper board and a lower board capable of being moved in a vertical direction, such that the upper board is capable of being moved with respect to the lower board in a front-rear direction and which allows a shopping cart to be kept by being seated on a luggage board.

BACKGROUND

Recreational vehicles (RV, SUV, MPV, etc.) are provided with a luggage room in which loads may be loaded at the rear of a rear seat, the floor of the luggage room consists of a luggage board, and a luggage tray which may receive a spare tire, a tool, etc. is provided under the luggage board, so that a storage space of the luggage tray is opened or closed by opening and closing operations of the luggage board.

Typically, a conventional general structure includes the luggage board installed to be simply placed on the luggage tray. Therefore, since the luggage board cannot be moved in a vertical direction and a front-rear direction of a vehicle, a worker may feel uncomfortable upon loading or pulling out loads on the luggage board.

Also, in the conventional art, when a shopping cart with wheels is loaded on the luggage board, the position of the shopping cart cannot be fixed, a drawback is caused in that loads is likely to break or be damaged.

The foregoing is intended merely to aid in the understanding of the background of the present invention, and is not intended to mean that the present invention falls within the purview of the related art that is already known to those skilled in the art.

SUMMARY OF THE INVENTION

In preferred aspects, provided is a luggage board apparatus for a vehicle, which includes an upper board and a lower board and is capable of being moved in a vertical direction and a front-rear direction, thereby improving the convenience of work upon keeping and pulling out loads.

Also, provided is a luggage board apparatus for a vehicle, which may keep a shopping cart by seating the shopping cart on a luggage board by using a slide rail provided on the luggage board and a slide roller coupled to the slide rail, and which allows the position of the shopping cart to be fixed upon loading the shopping cart on the luggage board, thereby maximally preventing loads from being broken or being damaged.

In an aspect, provided is a luggage board apparatus for a vehicle, and the luggage board includes an upper board and a lower board superimposed on each other in a vertical direction. The upper board and the lower board are capable of being moved together in the vertical direction, and the upper board is capable of being moved with respect to the lower board in a front-rear direction.

A full-size bed may be implemented through forward folding or backward reclining of a vehicle seat upon downward movement of the upper board and the lower board.

The luggage board apparatus may include a driving unit for vertical movement of the upper board and the lower board. The driving unit includes a motor; a lead screw rotated by receiving power of the motor; a nut coupled to the lead screw, and moved along the lead screw upon rotation of the lead screw; and an X-shaped that connects rod connected with the nut, connects floor of a luggage room and the lower board, and is changed in a vertical height thereof according to movement of the nut.

Two sets each configured by the lead screw, the nut and the X-shaped connecting rod may be symmetrically installed on left and right sides, and the motor may be configured by one motor to simultaneously actuate two lead screws.

Two sets each configured by the lead screw, the nut and the X-shaped connecting rod may be symmetrically installed on the left and right sides, and the motor may be configured by two motors each to be coupled to each lead screw.

Moving rollers which are rotated and are moved together upon movement of the nut may be coupled to one end of the X-shaped connecting rod, and the other end of the X-shaped connecting rod may be fixedly coupled to the floor of the luggage room and the lower board.

Two sets each configured by the lead screw, the nut and the X-shaped connecting rod may be symmetrically installed on the left and right sides. The luggage board apparatus may further include a support bar connecting X-shaped connecting rods on the left and right sides; and a gas lift connecting the support bar and the lower board.

A first slide rail is provided to the lower board to extend in the front-rear direction, and a first slide roller which is inserted into the first slide rail and is moved along the first slide rail, may be coupled to the upper board.

The first slide roller includes a plurality of rollers in contact with the first slide rail; and a roller housing to which the plurality of rollers are rotatably coupled. The rollers are rotated in a horizontal direction with respect to the roller housing.

Rail protrusions, which protrude inward of the first slide rail and extend in a lengthwise direction of the first slide rail, are formed on left and right side surfaces of the first slide rail, and the rollers are installed to be in contact with the rail protrusions.

A second slide rail, which extend in the front-rear direction, may be provided to the upper board, a second slide roller is inserted into the second slide rail and may be installed to be capable of being moved along the second slide rail, and loads or a storage box capable of being loaded into the luggage room may be seated on the second slide roller.

The second slide rail may extend along a straight line or a curved line in the front-rear direction.

The second slide roller may include a plurality of rollers in contact with the second slide rail; and a roller housing to which the plurality of rollers are rotatably coupled. The rollers are rotated in a horizontal direction with respect to the roller housing.

Rail protrusions, which protrude inward of the second slide rail and extend in a lengthwise direction of the second slide rail, may be formed on left and right side surfaces of the second slide rail, and the rollers may be installed to be in contact with the rail protrusions.

In an aspect, provided is a luggage board apparatus for a vehicle that includes a luggage board; a slide rail provided on an upper surface of the luggage board to extend in a front-rear direction; and a slide roller inserted into the slide rail and moved along the slide rail. As the slide roller and a lower end of a shopping cart are coupled to each other, the shopping cart may be seated on the luggage board and may be loaded and kept in a luggage room.

The slide rail may extend in a straight line in the front-rear direction or extends while including a curved section.

When the shopping cart is loaded into the luggage room, a roller provided on the lower end of the shopping cart may be inserted into the slide rail.

Two sets each configured by the slide rail and the slide roller may be symmetrically provided by being laterally spaced apart from each other. The luggage board apparatus may further include a roller moving bar coupled to connect slide rollers on left and right sides.

Two sets each configured by the slide rail and the slide roller may be symmetrically provided by being laterally spaced apart from each other. The luggage board apparatus may further include a movable storage box coupled to connect the slide rollers on the left and right sides.

Two sets each configured by the slide rail and the slide roller may be symmetrically provided by being laterally spaced apart from each other. The luggage board apparatus may further include a sliding board coupled to connect the slide rollers on left and right sides.

The luggage board apparatus may have a configuration in which a luggage board includes the upper board and the lower board, the upper board and the lower board are capable of being moved together in a vertical direction, and the upper board is capable of being moved in a front-rear direction with respect to the lower board, thereby providing an advantage in that the convenience of work is greatly improved upon keeping and pulling out loads.

In addition, the luggage board apparatus has a configuration in which a shopping cart may be kept by being seated and loaded on the luggage board by using a slide rail provided on the luggage board and a slide roller coupled to the slide rail, and the position of the shopping cart seated on the luggage board may be fixed, thereby providing an advantage in that it is possible to maximally prevent loads from being broken or being damaged.

Other aspects of the invention are disclosed infra.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
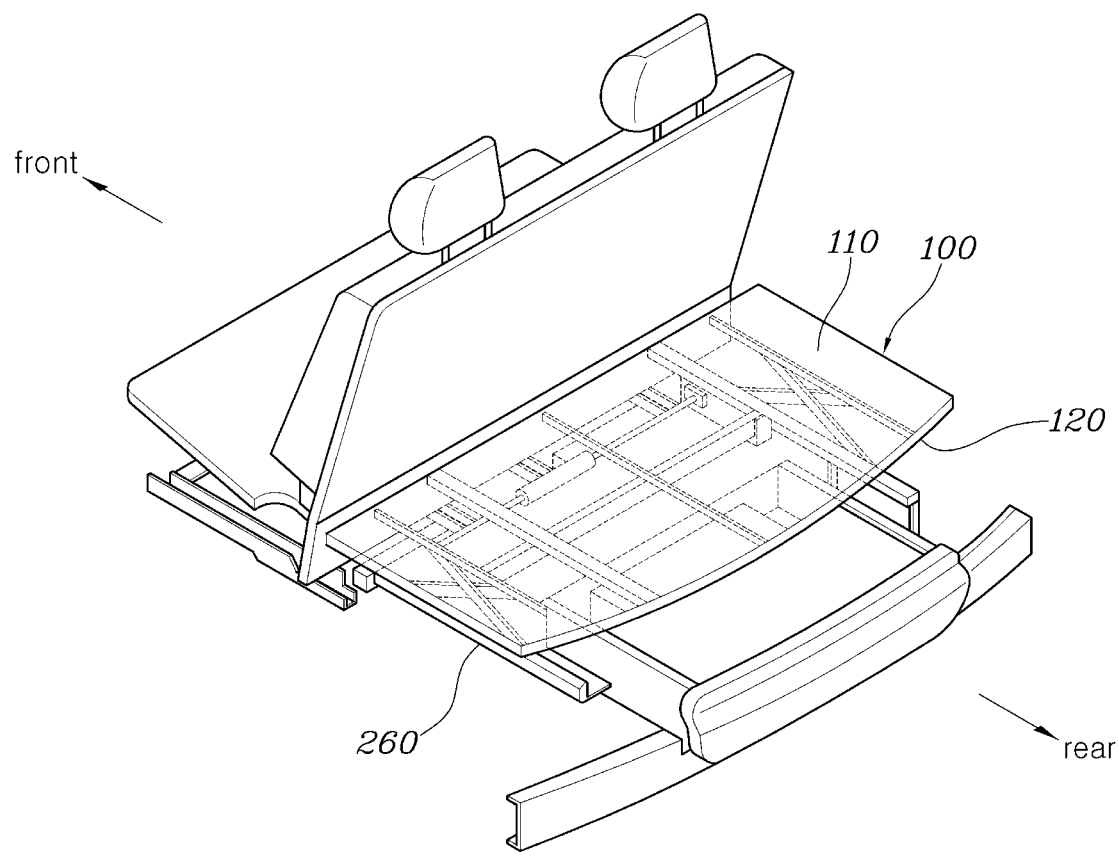
FIG. 1 shows a vehicle provided with a luggage board apparatus according to an exemplary embodiment of the present invention.

Specific structural or functional descriptions of the embodiments of the present invention disclosed herein are merely exemplified for the purpose of illustrating the embodiments according to the present invention, and the embodiments of the present invention are implemented in various forms, and may not be construed as being limited to the embodiments described in this specification or application.

Since the embodiment according to the present invention can be diversely modified into various forms, specific embodiments will be illustrated and described in detail in the drawings and the description of the present invention. However, this is not intended to limit the embodiments according to the concept of the present invention to specific invention forms, but should be understood to include all modifications, equivalents, or substitutes included in the spirit and scope of the present invention.

It will be understood that although the terms "first", "second", etc. may be used herein to describe various elements, these elements should not be limited by these terms. These terms are only used to distinguish one element from another element.

Thus, a first element discussed below could be termed a second element and vice versa without departing from the nature of the present invention.

It will be understood that when an element is referred to as being "connected" or "coupled" to another element, it can be directly connected or coupled to the other element or intervening elements may be present therebetween. In contrast, when an element is referred to as being "directly connected" or "directly coupled" to another element, there are no intervening elements present. Other expressions describing the relationship between the components, such as "between" and "immediately between" or "neighboring" and "directly neighboring" should also be interpreted in the same manner.

The terminology used herein is for the purpose of describing particular embodiments only and is not intended to limit the invention. As used herein, the singular forms "a", "an", and "the" are intended to include the plural forms as well, unless the context clearly indicates otherwise. It will be further understood that the terms "comprises" and/or "comprising", or "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless otherwise defined, the meaning of all terms including technical and scientific terms used herein is the same as that commonly understood by one of ordinary skill in the art to which the present invention pertains. It will be further understood that terms, such as those defined in commonly used dictionaries, should be interpreted as having a meaning which is consistent with their meaning in the context of the relevant art and the present invention, and will not be interpreted in an idealized or overly formal sense unless expressly so defined herein.

Hereinafter, a luggage board apparatus for a vehicle according to a preferred embodiment of the present invention will be described with reference to the accompanying drawings.

As illustrated in FIGS. 1 to 16, the luggage board apparatus for a vehicle according to various exemplary embodiments of the present invention includes an upper board 110 and a lower board 120 superimposed on each other in a vertical direction, the upper board 110 and the lower board 120 are capable of being moved together in a vertical direction, and the upper board 110 is capable of being moved in a front-rear direction with respect to the lower board 120.

A luggage board 100 may consist of the upper board 110 and the lower board 120 superimposed to be stacked in the vertical direction. The upper board 110 and the lower board 120 may be moved together in the vertical direction by using the power of a motor. The upper board 110 may be pulled out by being slidingly moved backward with respect to the lower board 120 by a user's manual manipulation, and may be superimposed again on the lower board 120 by being slidingly moved forward.

Figure 2:
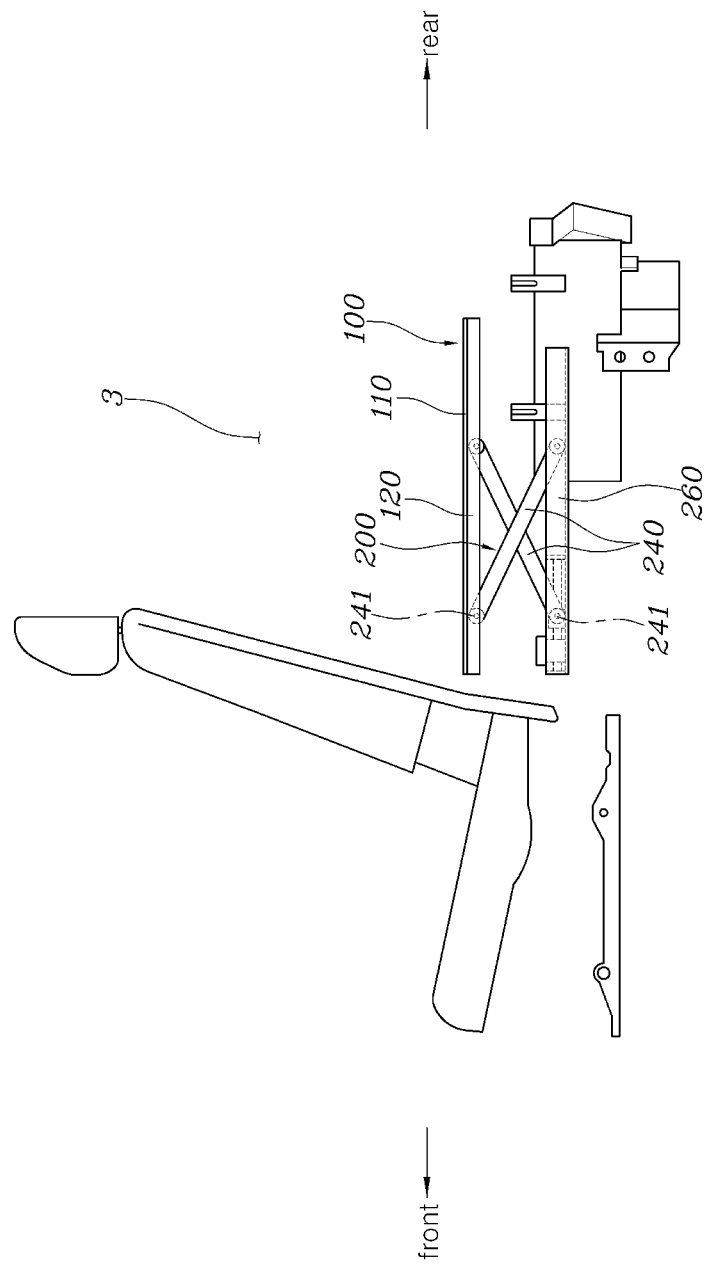
FIG. 2 shows a side view of FIG. 1.
Figure 3:
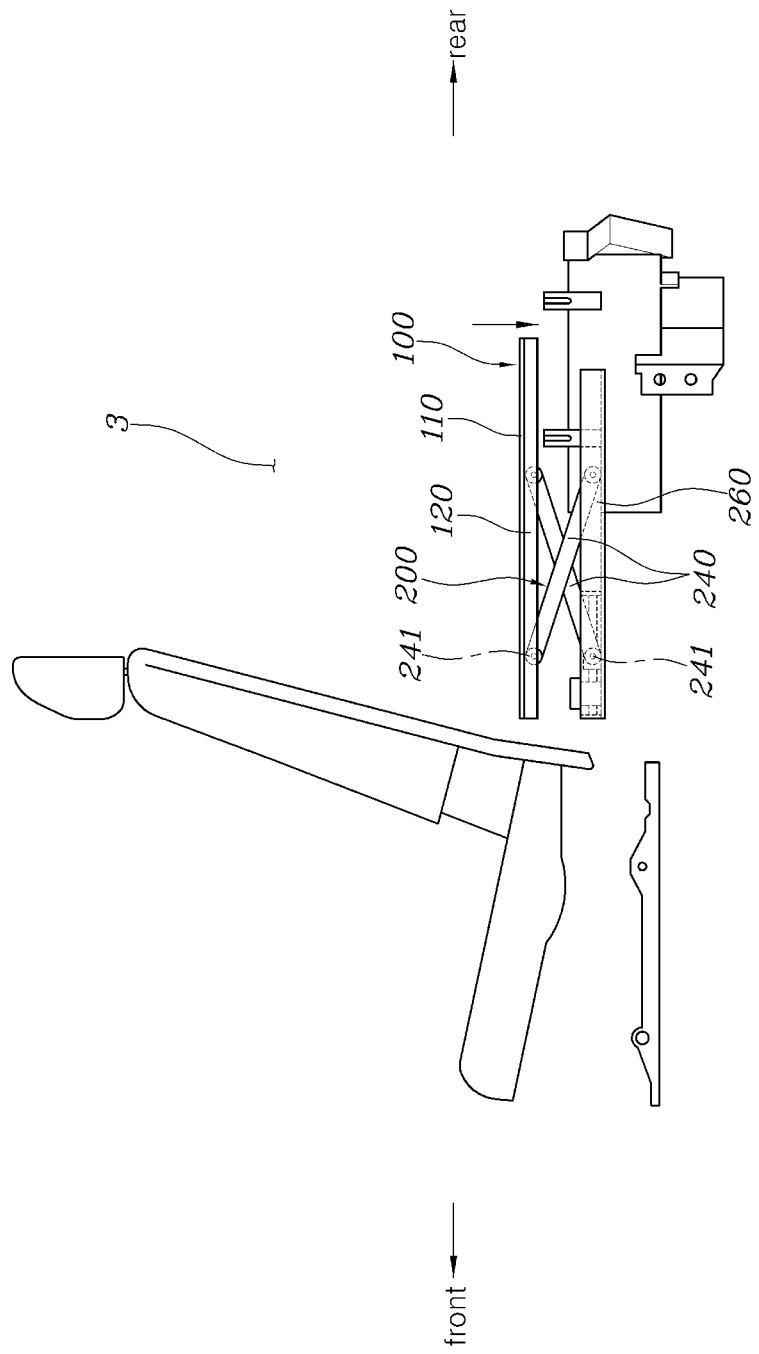
FIG. 3 shows a state in which a luggage board is moved downward from a state of FIG. 2.
Figure 4:
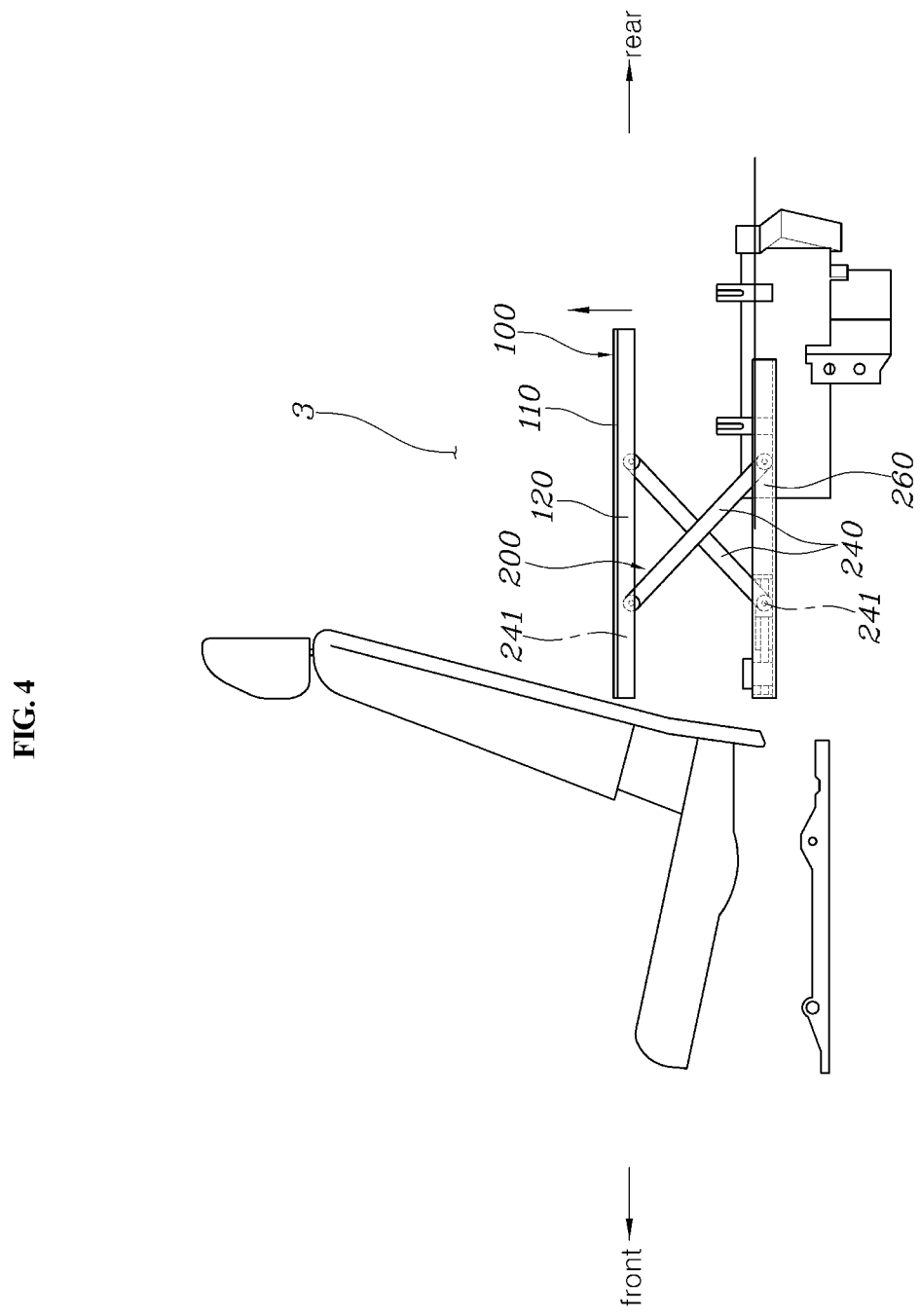
FIG. 4 shows a state in which the luggage board moves upward from the state of FIG. 2.
Figure 5:
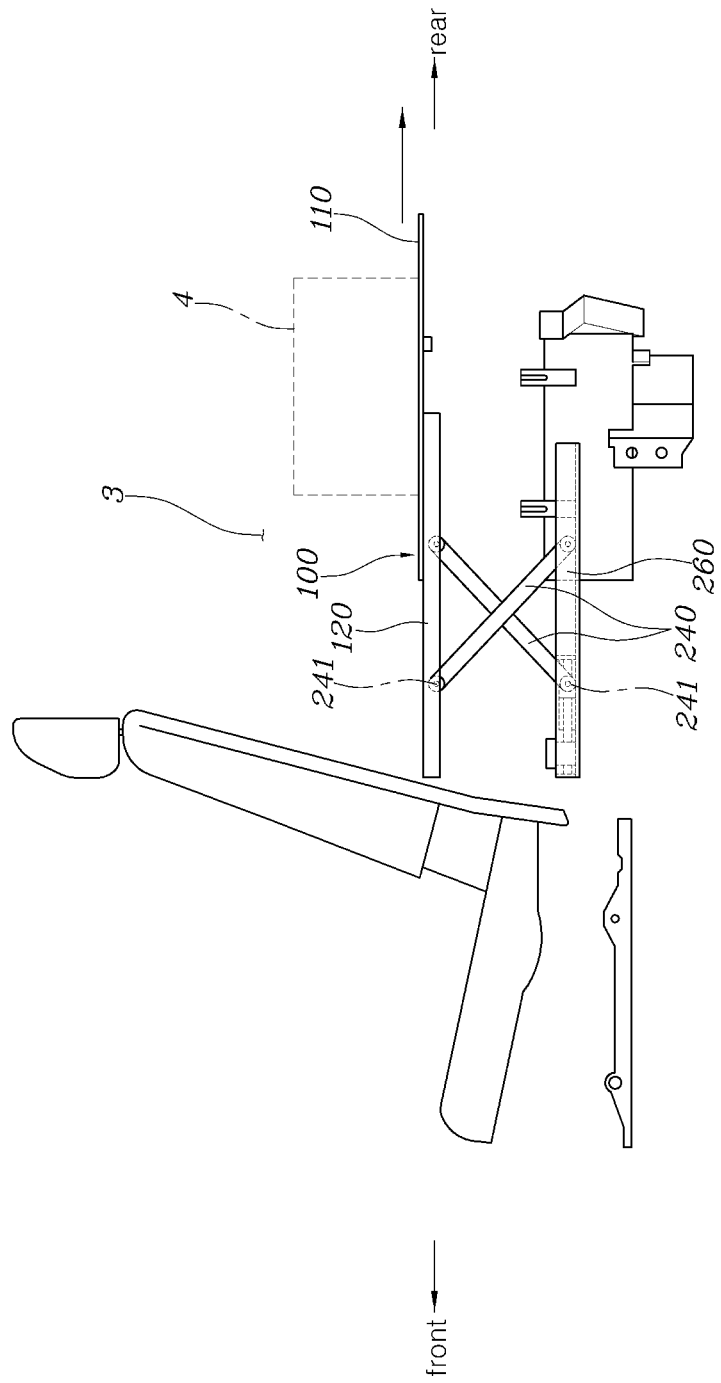
FIG. 5 shows a state in which an upper board is pulled out by being slidingly moved from a state of FIG. 4.

FIGS. 1 and 2 illustrate a state in which the luggage board 100 is positioned at a standard position, FIG. 3 illustrates a state in which the luggage board 100 is moved downward by a predetermined distance from the standard position of FIG. 2, FIG. 4 illustrates a state in which the luggage board 100 is moved upward by a predetermined distance from the standard position of FIG. 2, and FIG. 5 illustrates a state in which the upper board 110 is pulled out by being slidingly moved backward from the raised position of FIG. 4.

Figure 6:
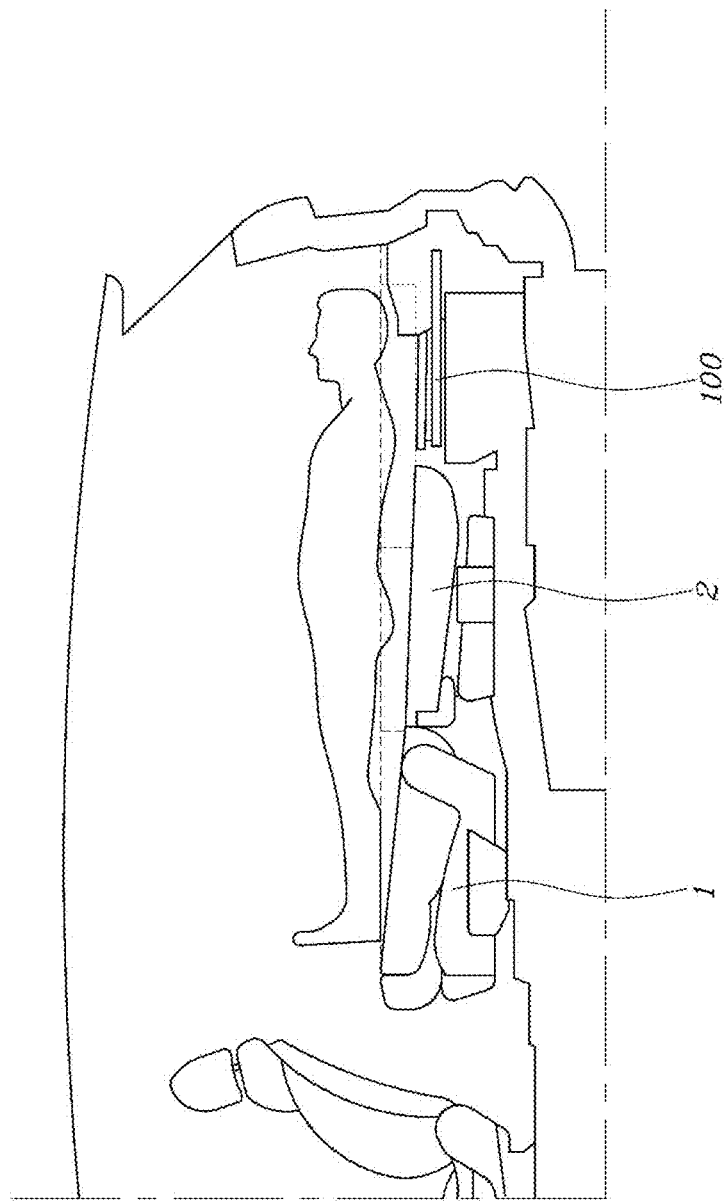
FIG. 6 shows a state in which the luggage board is moved downward and a vehicle seat is folded forward so that a full-size bed is implemented.
Figure 7:
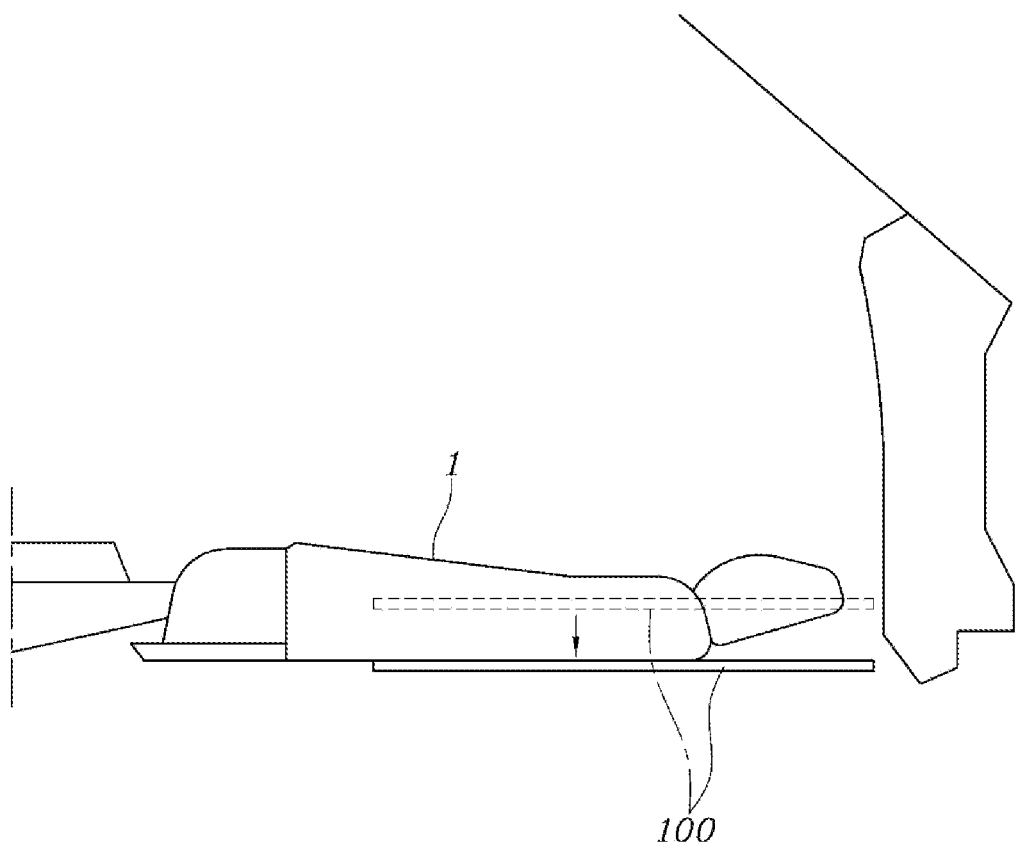
FIG. 7 shows a state in which the luggage board is moved downward and a vehicle seat is reclined backward so that a full-size bed is implemented.
Figure 8:
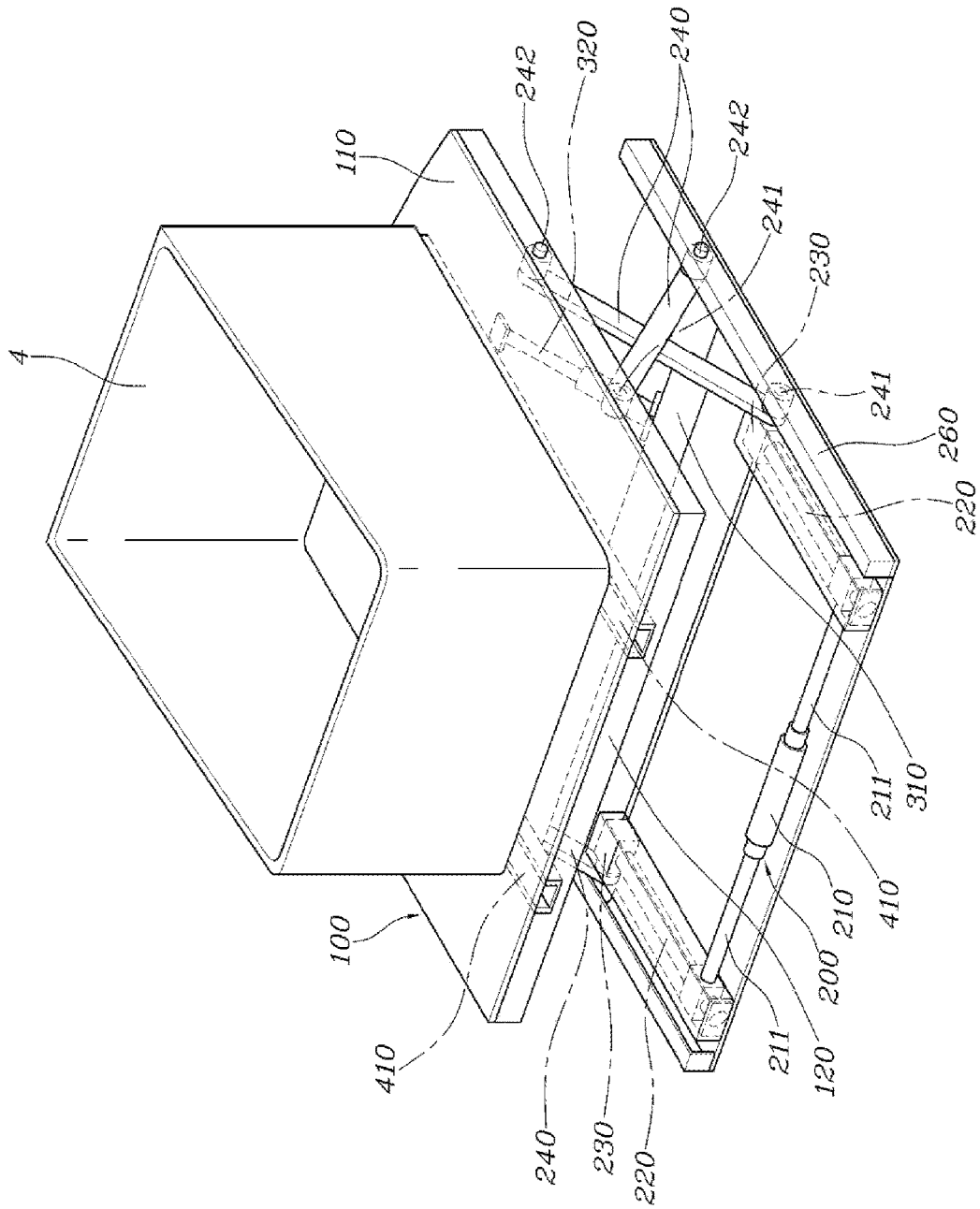
FIG. 8 shows an exemplary luggage board apparatus consisting of an exemplary motor according to an exemplary embodiment of the present invention.
Figure 9:
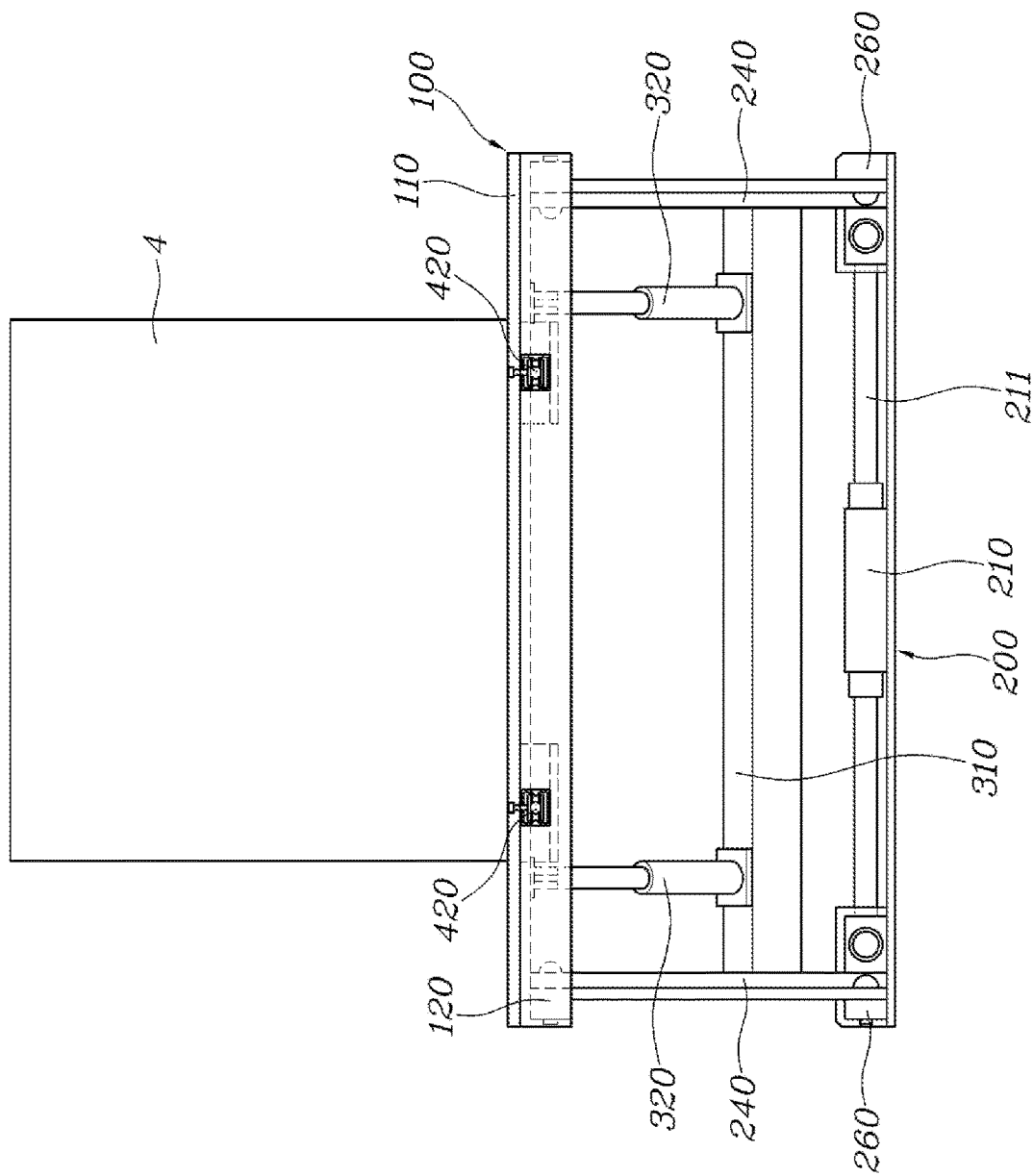
FIG. 9 shows a front view of FIG. 8.
Figure 10:
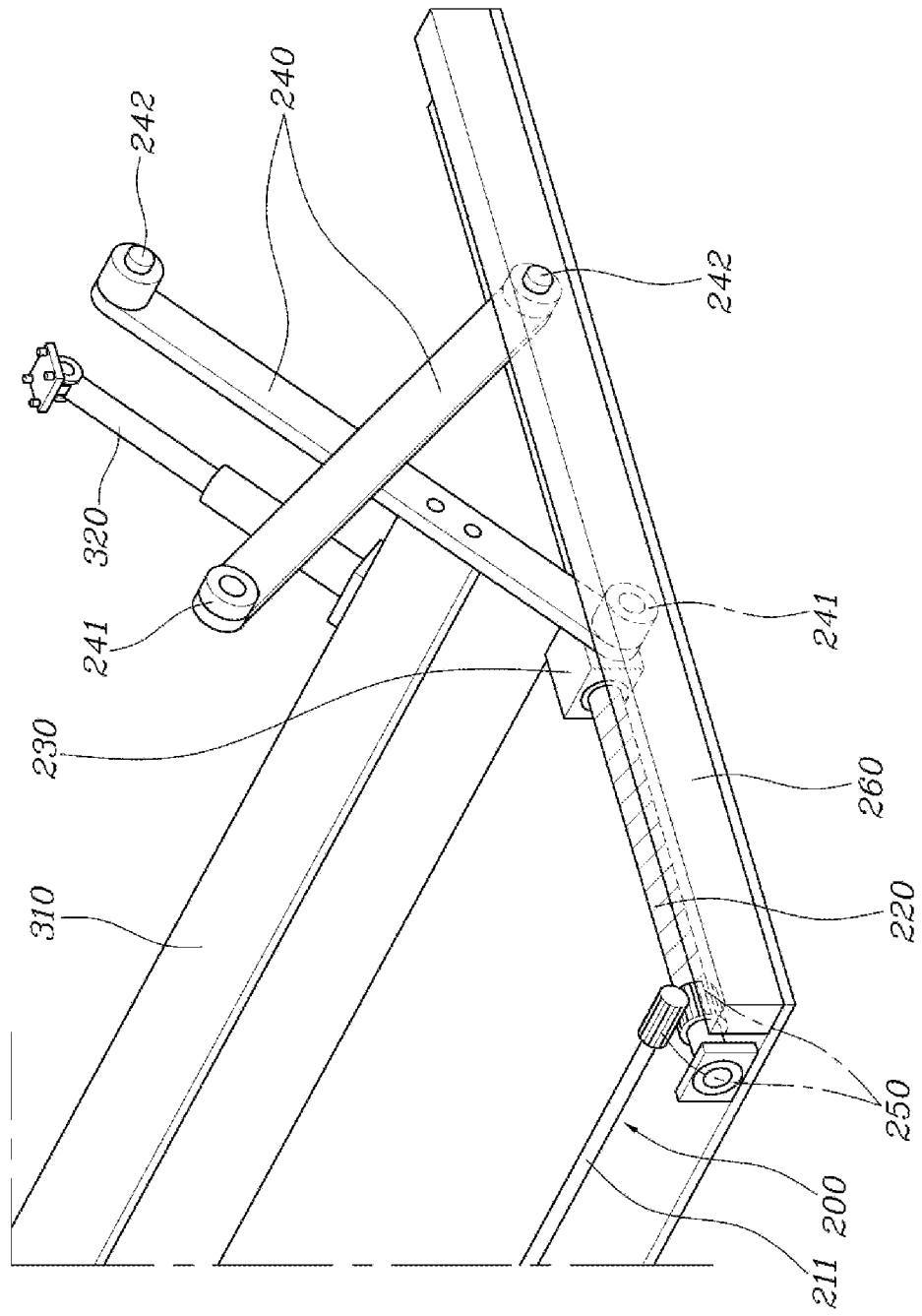
FIG. 10 shows a part where an X-shaped connecting rod is coupled in FIG. 8.
Figure 11:
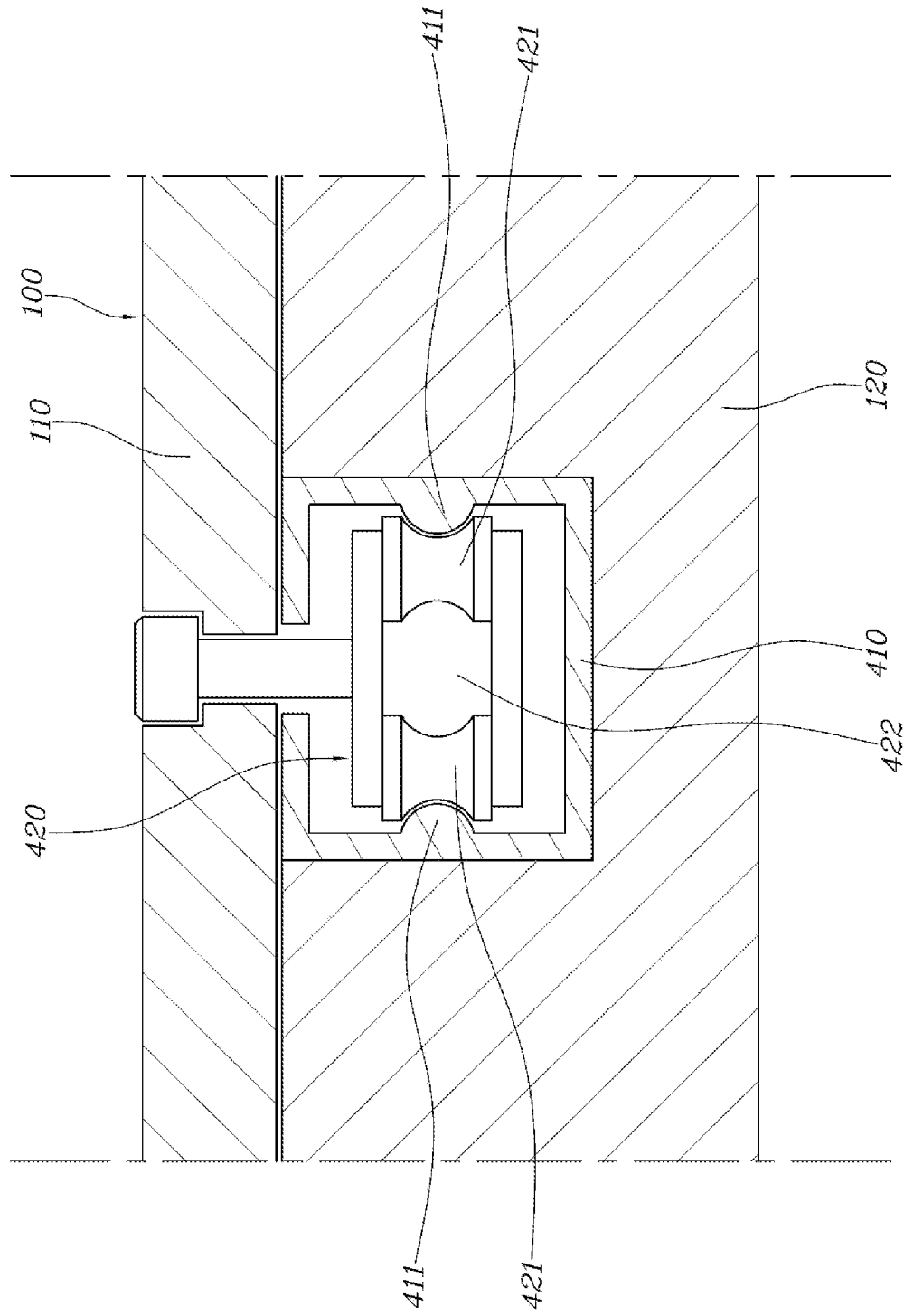
FIG. 11 shows a first slide rail and a first slide roller in FIG. 8.

The luggage board 100 may implement a full-size bed when vehicle seats 1 and 2 are folded forward as illustrated in FIG. 6 or a vehicle seat 1 is reclined backward as illustrated in FIG. 7, through the downward movement of the upper board 110 and the lower board 120, whereby a passenger may have a comfortable rest.

FIG. 6 illustrates a vehicle provided with three row seats, where the reference numeral 1 denotes a second row seat and the reference numeral 2 denotes a third row seat, and illustrates a state in which both the second row seat 1 and the third row seat 2 are folded forward.

FIG. 7 illustrates a vehicle provided with two row seats and illustrates a state in which a full-size bed is implemented by reclining a second row seat 1 backward.

The embodiment according to the present invention includes a driving unit 200 for the vertical movement of the upper board 110 and the lower board 120.

The driving unit 200 may include a motor 210, a lead screw 220 which is rotated by receiving power from the motor 210, a nut 230 which is coupled to the lead screw 22 and is moved along the lead screw 220 upon rotation of the lead screw 220, and an X-shaped connecting rod 240 which is connected to the nut 230, connects the floor of a luggage room 3 and the lower board 120 and is changed in the vertical height thereof according to the movement of the nut 230.

The motor 210 may be fixedly installed to be connected to the floor of the luggage room 3.

Ones of the lead screw 220, the nut 230 and the X-shaped connecting rod 240 may be coupled to form one set, and two sets are symmetrically installed by being laterally spaced apart from each other.

The motor 210 may be configured by one motor as illustrated in the embodiment of FIGS. 1 to 10, and one motor 210 may be configured to simultaneously actuate two lead screws 220 which are positioned on left and right sides. To this end, a motor shaft 211 protrudes to the left and right sides of the motor 210, and the motor shaft 211 and the lead screws 220 are coupled to be capable of transferring power through gear members 250.

When the motor 210 consists of one motor, cost reduction, weight loss and total package downscale are possible.

Figure 12:
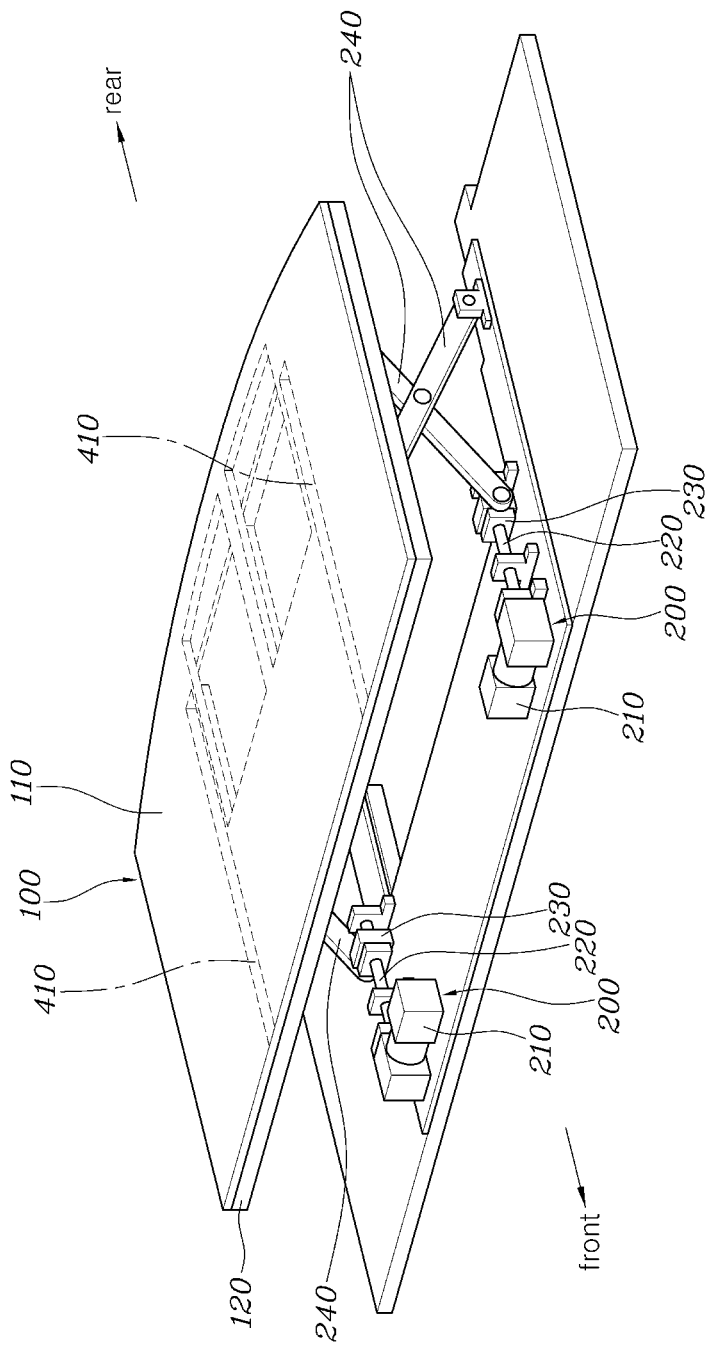
FIGS. 12 and 13 show the luggage board apparatus consisting of two motors according to an exemplary embodiment of the present invention.
Figure 13:
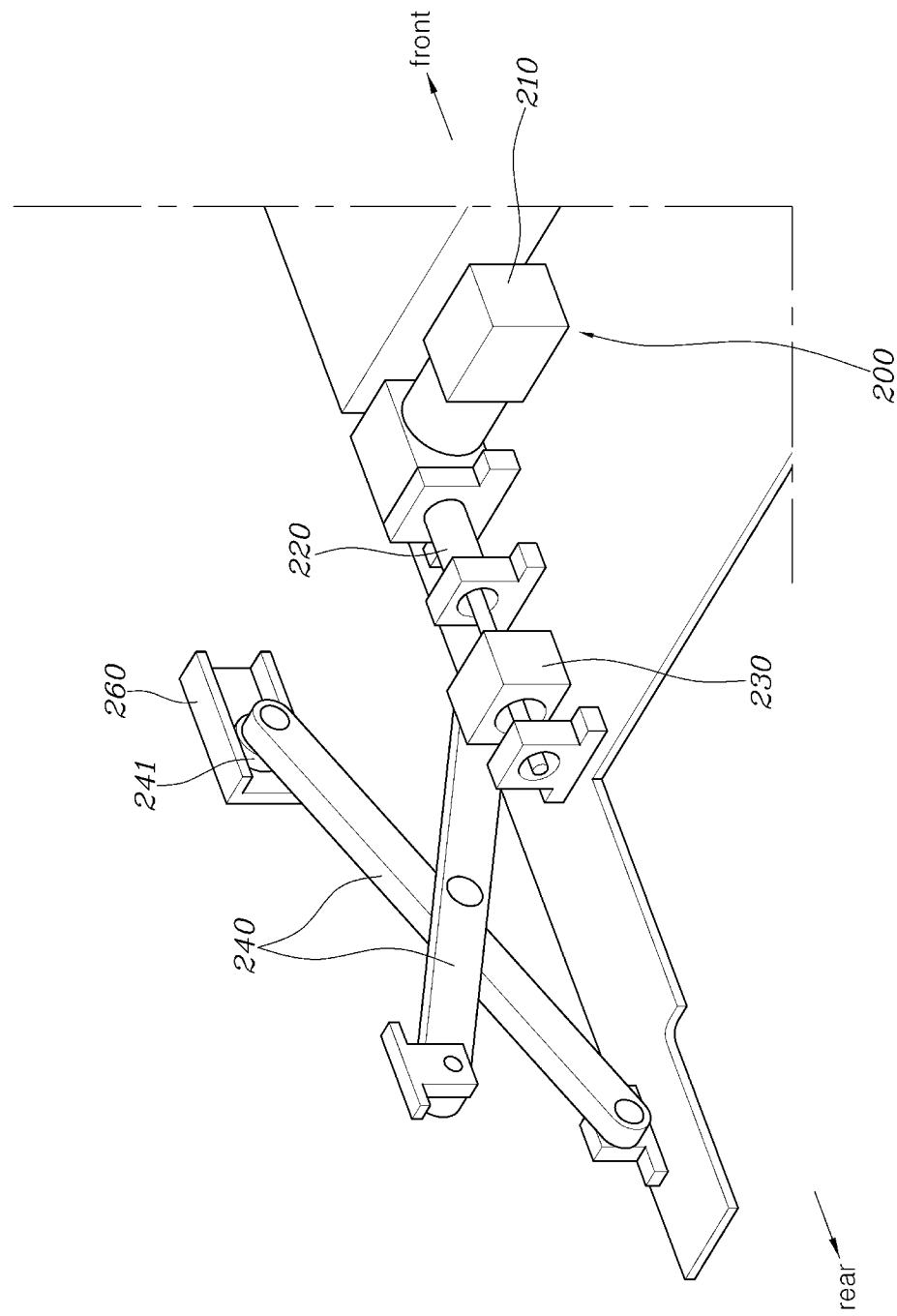

As another example, in order to reduce the load of the motor 210, the motor 210 may consist of two motors as illustrated in FIGS. 12 and 13, and in this case, each of the two motors 210 forms a structure in which each of the two motors 210 is independently coupled with one lead screw 220.

The X-shaped connecting rod 240 may have a structure in which two rods are crossed in an X-shape, and may have a structure in which middle portions of the rods are hinged to be capable of being rotated with respect to each other.

When the vertical height of the X-shaped connecting rod 240 is increased, the luggage board 100 is moved upward. Conversely, when the vertical height of the X-shaped connecting rod 240 is decreased, the luggage board 100 is moved downward.

In order for upward and downward movement of the luggage board 100, moving rollers 241 which are rotated and are thereby moved together upon movement of the nut 230 may be coupled to one end of the X-shaped connecting rod 240, and the other end of the X-shaped connecting rod 240 may have a structure in which it is fixedly coupled to the floor of the luggage room 3 and the lower board 120 by bolts 242.

The moving rollers 241 may be coupled to guide channels 260 to be capable of being moved along the guide channels 260, and the guide channels 260 may be provided to be fixed to the floor of the luggage room 3 and be coupled to the lower board 120.

The embodiment according to the present invention further includes a support bar 310 which connects two X-shaped connecting rods 240 positioned on left and right sides and gas lifts 320 which connect the support bar 310 and the lower board 120.

The support bar 310 and the gas lifts 320 may serve to more stably support the luggage board 100 under the luggage board 100.

In order for the sliding movement of the upper board 110 with respect to the lower board 120 in the front-rear direction, a first slide rail 410 may be provided to the lower board 120 to extend in the front-rear direction, and a first slide roller 420 which is inserted into the first slide rail 410 and is moved along the first slide rail 410 may be coupled to the upper board 110.

The first slide roller 420 may include a plurality of rollers 421 in contact with the first slide rail 410 and a roller housing 422 to which the plurality of rollers 421 are rotatably coupled.

The roller housing 422 may be formed in an external shape of a triangle, a quadrangle or a polygon. When the roller housing 422 has the shape of a triangle, the rollers 421 may be configured by three rollers and may be coupled to the corners, respectively, of the triangle. When the roller housing 422 has the shape of a quadrangle, the rollers 421 may be configured by four rollers.

The rollers 421 may be coupled to the roller housing 422 to be rotated in a horizontal direction with respect to the roller housing 422.

Rail protrusions 411, which protrude inward of the first slide rail 410 and extend in a lengthwise direction of the first slide rail 410, may be formed on the left and right sides surfaces of the first slide rail 410 and each roller 421 is formed, on the outer circumferential surface thereof, with an inwardly concave groove, and may be installed such that the concave groove is brought into contact with the rail protrusion 411. As a consequence, through minimization of slip and minimization of a friction part, smooth sliding movement of the upper board 110 in the front-rear direction may be endured.

Figure 14:
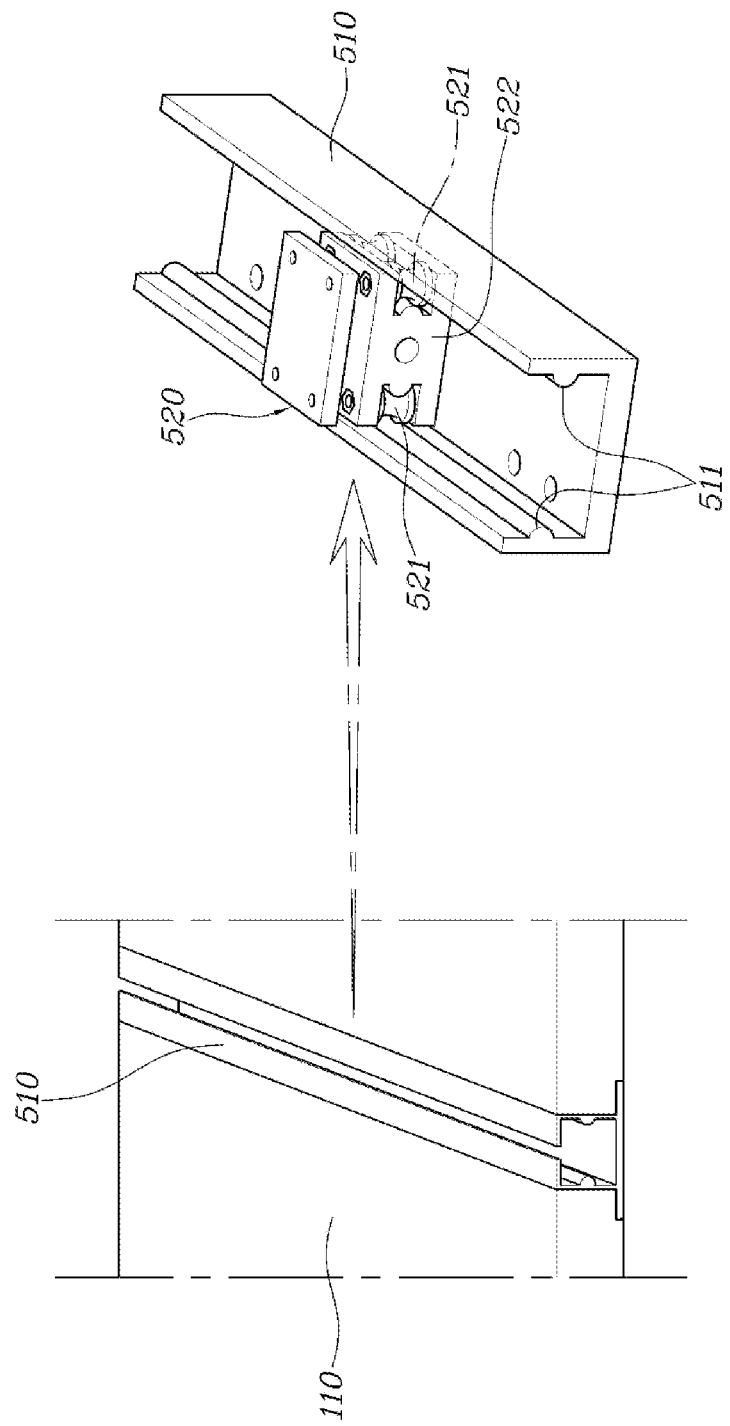
FIG. 14 shows a second slide rail and a second slide roller provided on the upper board according to an exemplary embodiment of the present invention.
Figure 15:
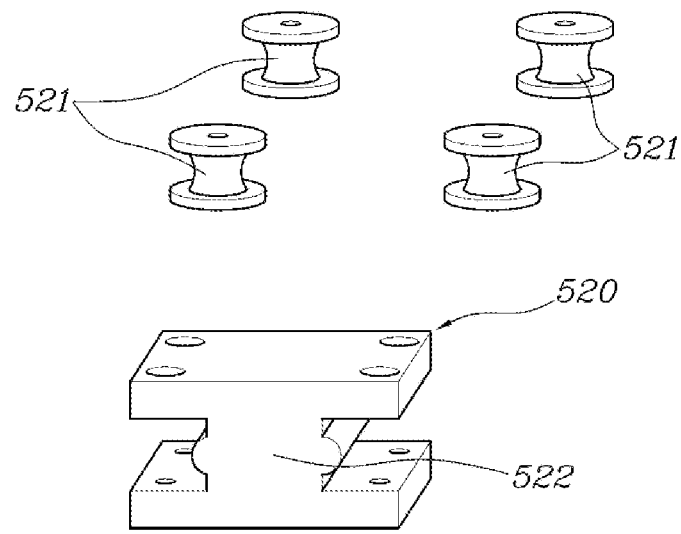
FIG. 15 shows the second slide rail and the second slide roller of FIG. 14.
Figure 15:
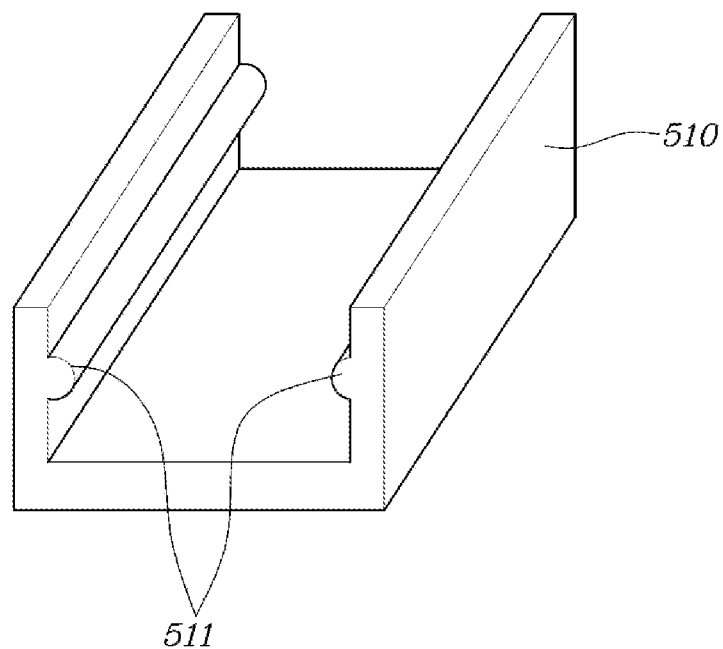

In addition, according to an exemplary embodiment of the present invention, a second slide rail 510 which extends in the front-rear direction may be provided to the upper board 110 as illustrated in FIG. 14, and a second slide roller 520 may be inserted into the second slide rail 510 and may be installed to be capable of being moved along the second slide rail 510. Loads 4 capable of being loaded into the luggage room 3 may be seated on the second slide roller 520, or a storage box may be coupled to and seated on the second slide roller 520.

As the loads 4 may be seated and moved on the second slide roller 520 which is moved along the second slide rail 510, a worker's convenience may be improved upon loading and pulling out the loads 4 on or from the luggage board 100.

Figure 16:
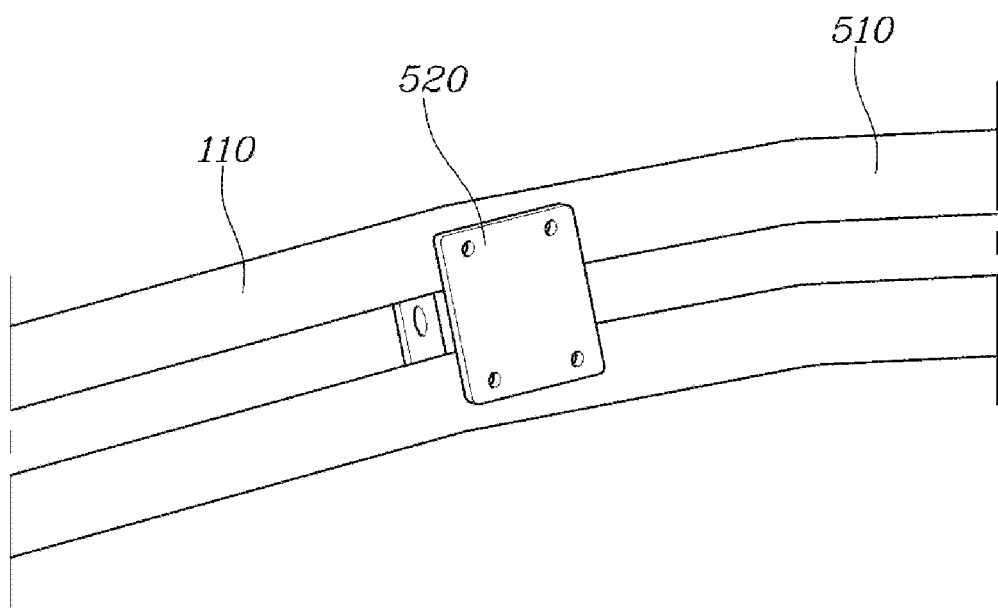
FIG. 16 shows a state in which the second slide rail is formed to include a curved section.

The second slide rail 510 may be formed to extend along a straight line in the front-rear direction as illustrated in FIG. 14 or include a section extending in a curve as illustrated in FIG. 16.

The second slide roller 520 includes a plurality of rollers 521 in contact with the second slide rail 510, and a roller housing 522 to which the plurality of rollers 521 are rotatably coupled.

The roller housing 522 may be formed in an external shape of a triangle, a quadrangle or a polygon. When the roller housing 522 has the shape of a triangle, the roller 521 may be configured by three rollers and may be coupled to the corners, respectively, of the triangle. When the roller housing 522 has the shape of a quadrangle, the rollers 521 may be configured by four rollers.

The rollers 521 may be coupled to the roller housing 522 to be rotated in the horizontal direction with respect to the roller housing 522.

The structure in which the roller housing 522 is formed in the shape of a triangle may be more free to be moved in a curved section as compared to the structure in which the roller housing 522 is formed in the shape of a quadrangle. Due to this fact, when the roller housing 522 of the quadrangular structure is used, the angle of a curved section of the second slide rail 510 may be set to be greater.

Rail protrusions 511, which protrude inward of the second slide rail 510 and extend in a lengthwise direction of the second slide rail 510, may be formed on the left and right side surfaces of the second slide rail 510, and each roller 521 may be formed, on the outer circumferential surface thereof, with an inwardly concave groove and is installed such that the concave groove may be brought into contact with the rail protrusion 511. As a consequence, through minimization of slip and minimization of a friction part, a smooth sliding movement of the upper board 110 in the front-rear direction may be ensured.

As illustrated in FIGS. 17 to 21, a luggage board apparatus includes a luggage board 100, a slide rail 610 which is provided on the upper surface of the luggage board 100 to extend in the front-rear direction, and a slide roller 620 which is inserted into the slide rail 610 to be moved along the slide rail 610. As the slide roller 620 and the lower end of a shopping cart 700 are coupled to each other, the shopping cart 700 may have a structure in which it is seated on the luggage board 100 and is loaded and kept in a luggage room 3.

The shopping cart 700 may be provided with a plurality of legs 710. When the shopping cart 700 is seated on the luggage board 100 and is loaded and kept in the luggage room 3, the joint parts of the legs 710 of the shopping cart 700 may be automatically bent and folded by the contact with the luggage board 100, thereby resulting in the foldable shopping cart 700.

Figure 17:
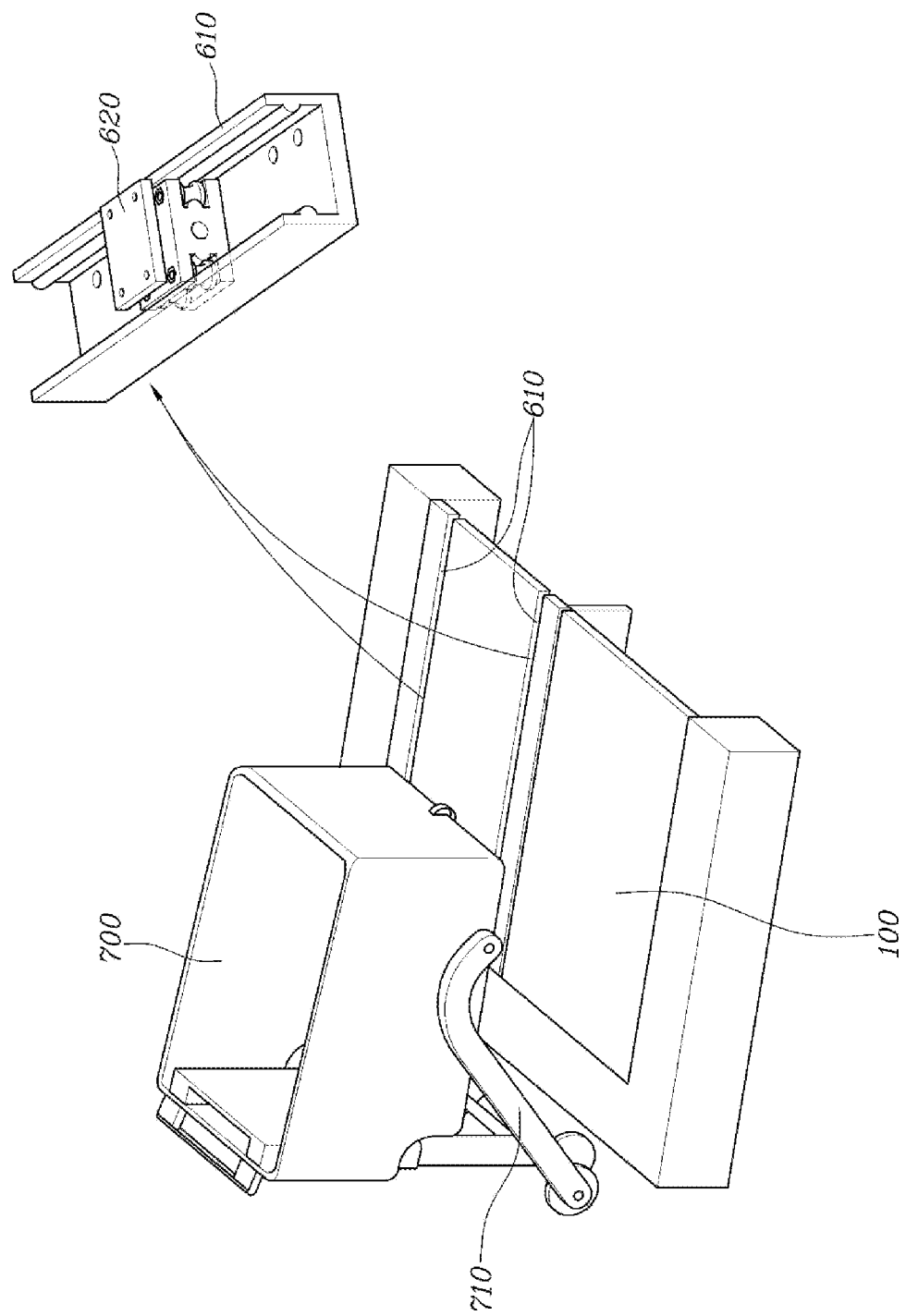
FIGS. 17 and 18 show a state in which a shopping cart is seated and loaded on a luggage board by using a slide rail and a slide roller provided on the upper board according to an exemplary embodiment of the present invention.
Figure 18:
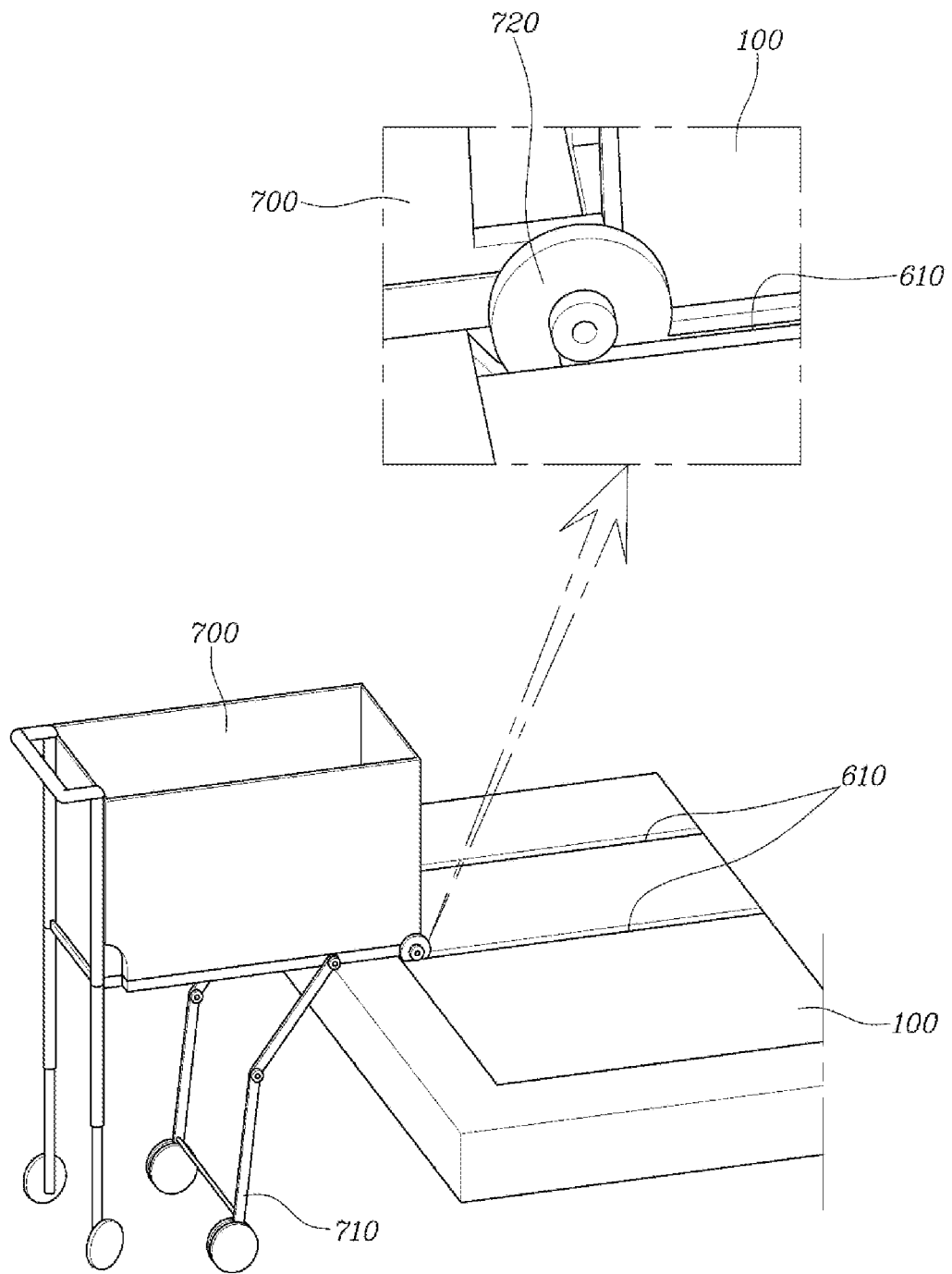

The slide rail 610 may be formed to extend in a straight line in the front-rear direction as illustrated in FIG. 17 or to include a section extended in a curve as in illustrated FIG. 16.

When the shopping cart 700 is seated on the luggage board 100 and is loaded into the luggage room 3, a roller 720 provided on the lower end of the shopping cart 700 may be inserted into the slide rail 610, and through this, the smooth movement of the shopping cart 700 along the slide rail 610 may be ensured.

The roller 720 provided at the lower end of the shopping cart 700 may be a roller which is rotated in a vertical direction.

Figure 19:
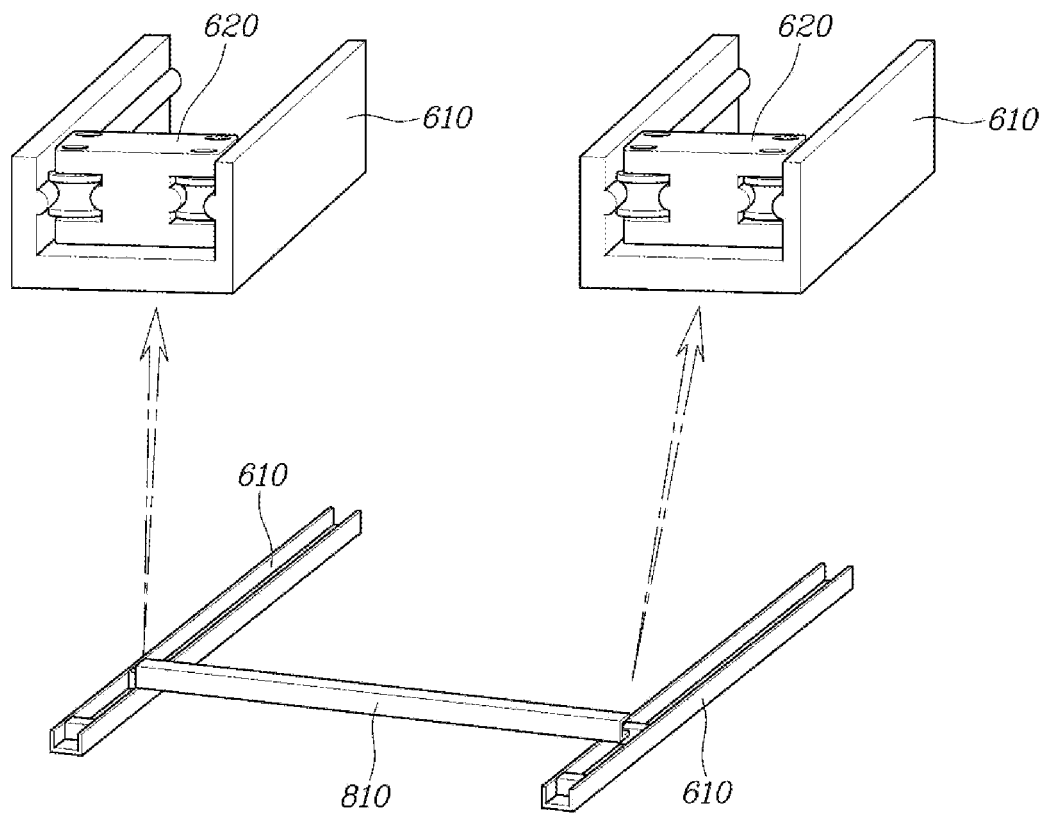
FIGS. 19 to 21 show embodiments of a roller moving bar, a movable storage box and a sliding board according to the present invention.

As illustrated in FIG. 19, a structure in which one slide rail 610 and one slide roller 620 are coupled to each other forms one set, and two sets are symmetrically installed by being laterally spaced apart from each other. A roller moving bar 810 may be coupled to connect the slide rollers 620 on the left and right sides.

When the number of roller moving bars 810 is increased, a structure such as a plate or a drawer may be moved by being placed on the roller moving bars 810, and through this, practicality and utilization can be improved.

Figure 20:
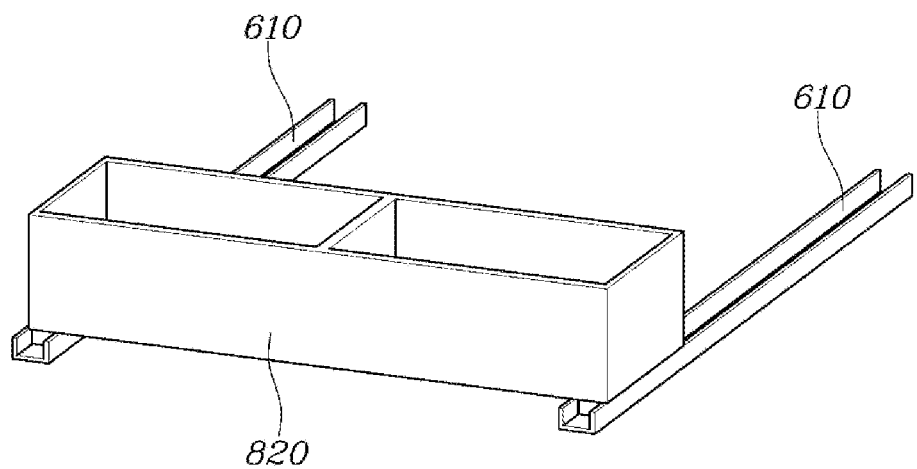
Figure 21:
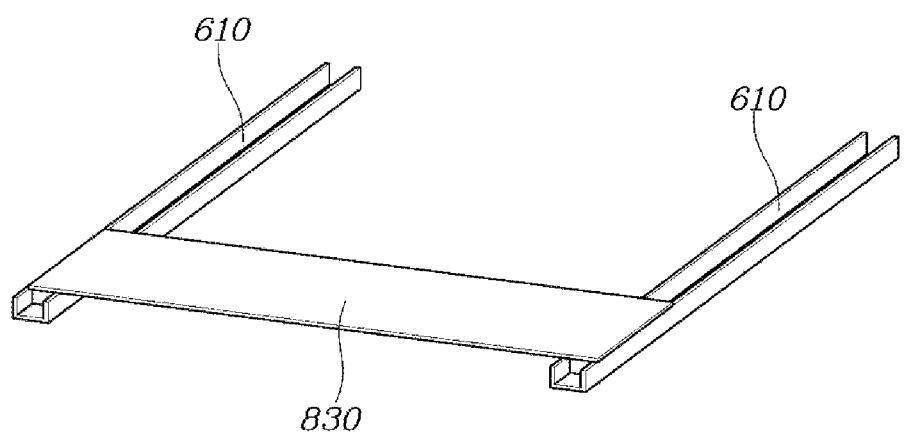

As another way to improve practicality and utilization, as shown in FIG. 20, a movable storage box 820 which is coupled to connect the slide rollers 620 on the left and right sides may be additionally included. As still another way, as illustrated in FIG. 21, a sliding board 830 which is coupled to connect the slides rollers 620 on the left and right sides may be additionally included.

The luggage board apparatus has a configuration in which the luggage board 100 includes the upper board 110 and the lower board 120, the upper board 110 and the lower board 120 are capable of be moved together in the vertical direction, and the upper board 110 is capable of being moved in the front-rear direction with respect to the lower board 120, thereby greatly improving the convenience of work upon keeping and pulling out loads.

In addition, the luggage board apparatus has a configuration in which the shopping cart 700 may be kept by being seated and loaded on the luggage board 100 by using the slide rail 610 provided on the luggage board 100 and the slide roller 620 coupled to the slide rail 610, and a position of the shopping cart 700 seated on the luggage board 100 may be fixed, thereby maximally preventing loads from being broken or being damaged.

Although the present invention has been described and illustrated with respect to the exemplary embodiments, it would be obvious to those skilled in the art that various improvements and modifications are possible, without departing from the scope and spirit of the present invention as disclosed in the accompanying claims.

What is claimed is:

1. A luggage board apparatus for a vehicle, comprising:
an upper board and a lower board stacked on each other in a vertical direction;
the upper board and the lower board capable of being moved together in the vertical direction;
the upper board capable of being moved with respect to the lower board in a front-rear direction;
a first slide rail provided on the upper board or the lower board to extend in the front-rear direction; and
a moving unit inserted into the first slide rail and moved along the first slide rail, the moving unit being coupled to the upper board or the lower board.

2. The luggage board apparatus of claim 1, wherein a full-size bed is implemented through forward folding or backward reclining of a vehicle seat upon downward movement of the upper board and the lower board.

3. The luggage board apparatus of claim 1, further comprising:
a driving unit for vertical movement of the upper board and the lower board,
wherein the driving unit comprises:
a motor;
a lead screw rotated by receiving power of the motor;
a nut coupled to the lead screw, and moved along the lead screw upon rotation of the lead screw; and
an X-shaped connecting rod connected with the nut, connecting floor of a luggage room and the lower board, and being changed in a vertical height thereof according to movement of the nut.

4. The luggage board apparatus of claim 3, wherein two sets each configured by the lead screw, the nut and the X-shaped connecting rod are symmetrically installed on left and right sides, and
the motor is configured by one motor to simultaneously actuate two lead screws.

5. The luggage board apparatus of claim 3, wherein two sets each configured by the lead screw, the nut and the X-shaped connecting rod are symmetrically installed on the left and right sides, and
the motor is configured by two motors each to be coupled to each lead screw.

6. The luggage board apparatus of claim 3, wherein moving rollers which are rotated and are moved together upon movement of the nut are coupled to one end of the X-shaped connecting rod, and
other end of the X-shaped connecting rod is fixedly coupled to the floor of the luggage room and the lower board.

7. The luggage board apparatus of claim 3, wherein two sets each configured by the lead screw, the nut and the X-shaped connecting rod are symmetrically installed on left and right sides, and
wherein the luggage board apparatus further comprises:
a support bar connecting X-shaped connecting rods on left and right sides; and
a gas lift connecting the support bar and the lower board.

8. The luggage board apparatus of claim 1, wherein the first slide rail is provided on the lower board, and
wherein the moving unit is coupled to the upper board.

9. The luggage board apparatus of claim 1, wherein the moving unit comprises a plurality of rollers in contact with the first slide rail; and a roller housing to which the plurality of rollers are rotatably coupled, and
wherein the rollers are rotated in a horizontal direction with respect to the roller housing.

10. The luggage board apparatus of claim 9, wherein rail protrusions, which protrude inward of the first slide rail and extend in a lengthwise direction of the first slide rail, are formed on left and right side surfaces of the first slide rail, and
the rollers are installed to be in contact with the rail protrusions.

11. The luggage board apparatus of claim 1, wherein a second slide rail, which extends in the front-rear direction, is provided on the upper board,
a slide roller is inserted into the second slide rail and is installed to be capable of being moved along the second slide rail, and
loads or a storage box capable of being loaded into a luggage room are seated on the slide roller.

12. The luggage board apparatus of claim 11, wherein the second slide rail extends along a straight line or a curved line in the front-rear direction.

13. The luggage board apparatus of claim 11, wherein the slide roller comprises:
a plurality of rollers in contact with the second slide rail; and
a roller housing to which the plurality of rollers are rotatably coupled, and
wherein the rollers are rotated in a horizontal direction with respect to the roller housing.

14. The luggage board apparatus of claim 13, wherein rail protrusions, which protrude inward of the second slide rail and extend in a lengthwise direction of the second slide rail, are formed on left and right side surfaces of the second slide rail, and
the rollers are installed to be in contact with the rail protrusions.

15. A luggage board apparatus for a vehicle, comprising:
a luggage board;
a slide rail provided on an upper surface of the luggage board to extend in a front-rear direction; and a slide roller inserted into the slide rail and moved along the slide rail, wherein as the slide roller and a lower end of a shopping cart are coupled to each other, the shopping cart is seated on the luggage board and is loaded and kept in a luggage room.

16. The luggage board apparatus of claim 15, wherein the slide rail extends in a straight line in the front-rear direction or extends while including a curved section.

17. The luggage board apparatus of claim 15, wherein when the shopping cart is loaded into the luggage room, a roller provided on the lower end of the shopping cart is inserted into the slide rail.

18. The luggage board apparatus of claim 15, wherein two sets each configured by the slide rail and the slide roller are symmetrically provided by being laterally spaced apart from each other, and wherein the luggage board apparatus further comprises:
a roller moving bar coupled to connect slide rollers on left and right sides.

19. The luggage board apparatus of claim 15, wherein two sets each configured by the slide rail and the slide roller are symmetrically provided by being laterally spaced apart from each other, and wherein the luggage board apparatus further comprises:
a movable storage box coupled to connect the slide rollers on left and right sides.

20. The luggage board apparatus of claim 15, wherein two sets each configured by the slide rail and the slide roller are symmetrically provided by being laterally spaced apart from each other, and wherein the luggage board apparatus further comprises:
a sliding board coupled to connect the slide rollers on left and right sides.

* * * * *